United States Patent
Manthey (10) Patent No.: US 8,359,116 B2
(45) Date of Patent: Jan. 22, 2013

(54) PRODUCTION MANAGEMENT SYSTEM (75) Inventor: Arne Manthey, Lachnersts (DE)

(73) Assignee: SAP AG, Walldorf (DE)

( * ) Notice: Subject to any disclaimer, the term of this patent is extended or adjusted under 35 U.S.C. 154(b) by 609 days.

(21) Appl. No.: 12/558,246

(22) Filed: Sep. 11, 2009

(65) Prior Publication Data

US 2011/0066275 A1   Mar. 17, 2011

(51) Int. Cl.
   *G06F 19/00* (2011.01)
(52) U.S. Cl. .................. 700/108; 700/100; 700/109
(58) Field of Classification Search .................. 700/100, 700/108, 109
   See application file for complete search history.

(56) References Cited

U.S. PATENT DOCUMENTS

| | | | |
|---|---|---|---|
| 4,495,582 A * | 1/1985 | Dessert et al. ................. | 700/124 |
| 5,128,196 A * | 7/1992 | Luetkens et al. .............. | 428/213 |
| 5,221,395 A * | 6/1993 | Luetkens et al. ............ | 428/304.4 |
| 5,233,533 A * | 8/1993 | Edstrom et al. .............. | 700/103 |
| 5,354,402 A * | 10/1994 | Luetkens et al. ........... | 428/304.4 |
| 5,462,794 A * | 10/1995 | Lindemann et al. ........ | 428/317.1 |
| 6,088,626 A * | 7/2000 | Lilly et al. .................... | 700/100 |
| 6,192,297 B1 * | 2/2001 | Marobin ........................ | 700/245 |
| 6,266,887 B1 * | 7/2001 | Owens et al. .................... | 30/513 |
| 6,349,241 B1 * | 2/2002 | Peron et al. .................... | 700/134 |
| 6,539,271 B2 * | 3/2003 | Lech et al. .................... | 700/108 |
| 6,594,535 B1 * | 7/2003 | Costanza ........................ | 700/97 |
| 6,658,375 B1 * | 12/2003 | McQuarrie et al. ............... | 703/2 |
| 6,746,879 B1 * | 6/2004 | Chen ............................. | 700/121 |
| 6,752,431 B1 * | 6/2004 | Matthews et al. ............... | 283/81 |
| 6,801,820 B1 * | 10/2004 | Lilly et al. .................... | 700/100 |
| 6,879,873 B2 * | 4/2005 | Passant ......................... | 700/101 |
| 7,016,742 B2 * | 3/2006 | Jarrell et al. .................... | 700/28 |
| 7,043,323 B2 * | 5/2006 | Passant ......................... | 700/101 |
| 7,089,071 B2 * | 8/2006 | Lilly et al. .................... | 700/100 |
| 7,107,112 B2 * | 9/2006 | Brown .......................... | 700/100 |
| 7,121,952 B2 * | 10/2006 | Coleman, Sr. .................. | 470/34 |
| 7,167,767 B2 * | 1/2007 | Clayton et al. ................. | 700/100 |
| 7,206,656 B2 * | 4/2007 | Clayton et al. ................. | 700/157 |
| 7,501,037 B2 * | 3/2009 | Stroup et al. ................... | 156/267 |
| 7,519,444 B2 * | 4/2009 | Lilly et al. .................... | 700/100 |
| 7,861,434 B2 * | 1/2011 | Knudsen ......................... | 33/613 |
| 7,866,060 B2 * | 1/2011 | Carin et al. ...................... | 34/487 |
| 7,886,564 B2 * | 2/2011 | Suzuki et al. ................... | 700/104 |
| 7,930,053 B2 * | 4/2011 | Loy et al. ........................ | 700/96 |
| 7,966,740 B2 * | 6/2011 | Knudsen ......................... | 33/613 |
| 7,975,398 B2 * | 7/2011 | Carin et al. ...................... | 34/60 |
| 7,996,100 B2 * | 8/2011 | Brown .......................... | 700/100 |
| 8,010,216 B2 * | 8/2011 | Roise ............................ | 700/100 |
| 8,091,395 B2 * | 1/2012 | Suzuki et al. ................... | 700/104 |
| 8,109,006 B2 * | 2/2012 | Knudsen ......................... | 33/613 |
| 2001/0011565 A1 * | 8/2001 | Arvedi ........................... | 148/546 |
| 2002/0082736 A1 * | 6/2002 | Lech et al. .................... | 700/108 |
| 2002/0083401 A1 * | 6/2002 | Breiner et al. .................... | 716/4 |
| 2002/0116083 A1 * | 8/2002 | Schulze ......................... | 700/108 |
| 2003/0033044 A1 * | 2/2003 | Bilyeu .......................... | 700/117 |
| 2003/0226433 A1 * | 12/2003 | Passant ........................... | 83/13 |
| 2003/0233212 A1 * | 12/2003 | Von Drasek et al. ........... | 702/179 |

(Continued)

*Primary Examiner* — Mohammad Ali
*Assistant Examiner* — Kelvin Booker (57) ABSTRACT

A monitoring system includes a control circuit configured to determine scrap values, yield values, and remainder values for at least a first operation and a second operation. The control circuit is configured to transmit one or more display signals. The one or more display signals include instructions to display a first operation status bar and a second operation status bar. The first operation status bar includes a first operation yield value, a first operation scrap value, and a first operation remainder value. The second operation status bar includes a second operation yield value, a second operation scrap value, and a second operation remainder value.

11 Claims, 9 Drawing Sheets

U.S. PATENT DOCUMENTS

| | | | |
|---|---|---|---|
| 2005/0028921 A1* | 2/2005 | Stroup et al. | 156/182 |
| 2005/0137735 A1* | 6/2005 | Loy et al. | 700/109 |
| 2005/0182506 A1* | 8/2005 | Passant | 700/100 |
| 2006/0259338 A1* | 11/2006 | Rodrigue et al. | 705/7 |
| 2007/0011854 A1* | 1/2007 | Pessolano | 29/33 R |
| 2007/0067125 A1* | 3/2007 | Guivarch et al. | 700/109 |
| 2007/0192128 A1* | 8/2007 | Celestini | 705/1 |
| 2007/0231425 A1* | 10/2007 | Ream et al. | 426/3 |
| 2007/0231427 A1* | 10/2007 | Ream | 426/5 |
| 2007/0231432 A1* | 10/2007 | Ream et al. | 426/87 |
| 2007/0231434 A1* | 10/2007 | Ream et al. | 426/383 |
| 2007/0231435 A1* | 10/2007 | Ream et al. | 426/383 |
| 2009/0071609 A1* | 3/2009 | Stroup et al. | 156/559 |
| 2009/0234485 A1* | 9/2009 | Behm et al. | 700/109 |
| 2010/0161383 A1* | 6/2010 | Butler | 705/10 |
| 2010/0229415 A1* | 9/2010 | Knudsen | 33/613 |
| 2011/0098969 A1* | 4/2011 | Knudsen | 702/150 |
| 2011/0111189 A1* | 5/2011 | Gilbert | 428/206 |
| 2011/0196525 A1* | 8/2011 | Bogue | 700/103 |
| 2011/0196527 A1* | 8/2011 | De Lille et al. | 700/103 |
| 2011/0252658 A1* | 10/2011 | Knudsen | 33/645 |
| 2011/0318527 A1* | 12/2011 | Susnjara | 700/159 |
| 2012/0124800 A1* | 5/2012 | Knudsen | 29/407.05 |

* cited by examiner

| Op. | Description | Factor* | % | Yield | Progress Contribution |
|---|---|---|---|---|---|
| 0010 | Cutting | 15 min. | 30% | 60% | 30% x 60% = 18% |
| 0020 | Assembling | 30 min. | 60% | 20% | 60% x 20% = 12% |
| 0030 | Packaging | 5 min. | 10% | 10% | 10% x 10% = 1% |
| Total | | 50 min. | 100% | | 31% |

| Op. | Description | Weight | Yield | | Scrap | WIP correction | |
|---|---|---|---|---|---|---|---|
| | | % | % | Weighted % | % | Scrap | Last Op. |
| 0010 | Cutting | 30% | 60% | 30% x 60% = 18% | 20% | | |
| 0020 | Assembling | 60% | 20% | 60% x 20% = 12% | 10% | -3% | |
| 0030 | Packaging (last) | 10% | 10% | 10% x 10% = 1% | 0% | | -10% |
| Total | | 100% | | 31% | 30% | -3% | -10% |

PRODUCTION MANAGEMENT SYSTEM

BACKGROUND

The present disclosure relates generally to the field of production management. More specifically, the disclosure relates to innovative ways of monitoring, controlling, and managing the process of manufacturing.

SUMMARY

One embodiment of the disclosure relates to a monitoring system including a control circuit configured to determine scrap values, yield values, and remainder values for at least a first operation and a second operation. The control circuit, which may for example be implemented in program logic in a computer system, is configured to transmit one or more display signals. The one or more display signals include instructions to display a first operation status bar and a second operation status bar. The first operation status bar includes a first operation yield value, a first operation scrap value, and a first operation remainder value. The second operation status bar includes a second operation yield value, a second operation scrap value, and a second operation remainder value.

Another embodiment of the disclosure relates to a method for monitoring a system. The method includes determining a first operation scrap value, a first operation yield value, and a first operation remainder value. The method further includes determining a second operation scrap value, a second operation yield value, and a second operation remainder value. The method includes transmitting one or more display signals. The method also includes displaying a first operation status bar which includes a first operation yield value, a first operation scrap value, and a first operation remainder value. The first operation status bar represents product production for a first operation. Also, the method includes displaying a second operation status bar which includes a second operation yield value, a second operation scrap value, and a second operation remainder value. The second operation status bar represents product production for a second operation Another embodiment of the disclosure relates to a monitoring system including a control circuit configured to determine scrap values, yield values, and remainder values for at least a first operation and a second operation. The control circuit, which may for example be implemented in program logic in a computer system, is configured to determine at least a first operation weighting factor and a second operation weighting factor. The control circuit is further configured to determine a first operation progress contribution based on a first operation yield value and the first operation weighting factor. The control circuit is configured to determine a second operation progress contribution based on a second operation yield value and the second operation weighting factor. The control circuit is further configured to determine a total progress based on the first operation progress contribution and the second progress contribution. In addition, the control circuit is configured to transmit one or more display signals. The one or more display signals include instructions to display a first operation status bar. The first operation status bar includes a first operation status bar area. The first operation status bar area has dimensions based on the first operation weighting factor. The first operation status bar includes a first operation yield value, a first operation scrap value, and a first operation remainder value. The one or more display signals further include instructions to display a second operation status bar. The second operation status bar includes a second operation status bar area. The second operation status bar area has dimensions based on the second operation weighting factor. The second operation status bar includes a second operation yield value, a second operation scrap value, and a second operation remainder value.

DETAILED DESCRIPTION OF THE EXEMPLARY EMBODIMENTS

Figure 1:
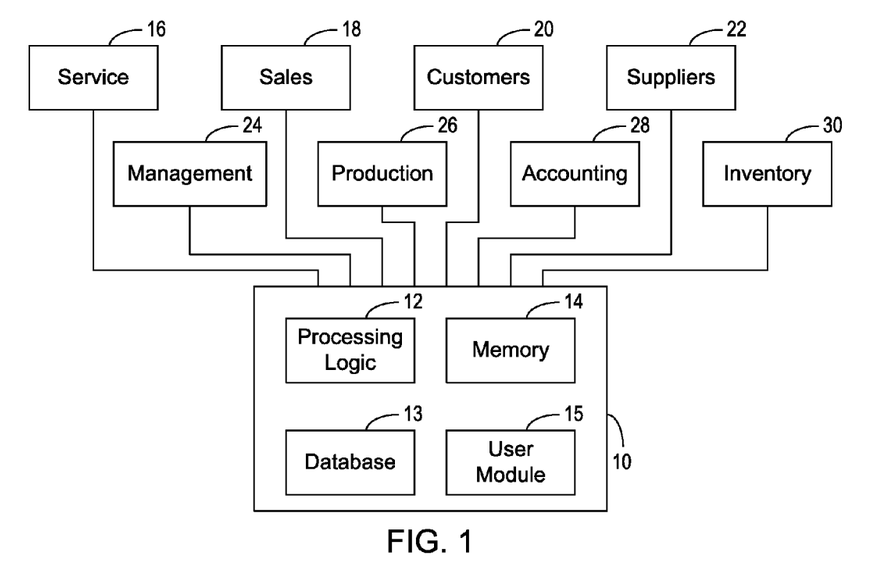
FIG. 1 is a block diagram, according to one exemplary embodiment.

Referring to FIG. 1, a block diagram of a production management system 10 is shown, according to an exemplary embodiment. Production management system 10 may include a processing logic 12, a database 13, a memory 14, and a user module 15. Production management system 10 may receive data from a service data source 16, a sales data source 18, a customer data source 20, a supplier data source 22, a management data source 24, a production data source 26, an accounting data source 28, or an inventory data source 30, according to exemplary embodiments.

Service data source 16 may provide data including information relating to maintenance activity, equipment failure, failure rate, repair time, or any operational status information for equipment of the production line. Service data source 16 may also provide data including information relating to maintenance activity, failure rate, or any product life cycle data regarding products being produced. Service data may be utilized to forecast data relating to production. In addition, service data may be utilized in production process management. For example, a production process may entail multiple (e.g., four) operations (e.g., cutting, fitting, welding, and packaging) to produce a product. Service data may indicate that one of the two packaging machines is down and will be repaired in an hour. This repair status, reduced throughput on the packaging machines, and repair time may be utilized in order progression determination discussed in more detail below.

Sales data source 18 may provide data including information relating to projected sales, delivery dates, order dates, customer priority, customer value, customer profitability, order profitability, order history, or order history performance data. For example, customer priority may be utilized to reorganize the production process to modify the order of product production. In this exemplary embodiment, process progression determination and customer priority may be both factored into the determination of how the product production may be reorganized.

Customer data source 20 may provide data including information relating to customer inventory data, customer production data, or substitute product data. The customer's production data may be utilized to determine process progression and/or modify product production. For example, the customer may have two product lines. Product one has increased production by over 100% versus the previous forecast and product two has decreased over 50% versus the previous forecast. In an exemplary embodiment, the increased production of product one and/or the decreased production of product two may be utilized to modify the process progression determination. Further, the process progression determination and/or the increase/decrease in production of product one/two may be utilized to reconfigure the product production process.

Supplier data source 22 may provide data including information relating to raw material availability, order date, delivery date, raw material shortages, raw material supply, substitute product data, raw material production data, or supplier performance history (e.g., on-time delivery, raw material scrap rate, failure rate, etc.). The supplier's production data may be utilized to determine process progression and/or modify product production. For example, the supplier may provide raw material (e.g., Grade B fasteners) to the product production process. However, the supplier's Grade B fasteners line has a production disturbance (e.g., fire, machine failure, strike, etc.) which will result in a two-day delay in shipments of Grade B fasteners. In an exemplary embodiment, supplier's Grade A fasteners which may be delivered on time can be substituted for Grade B fasteners in the production process. In an exemplary embodiment, processing logic 12 (e.g., control circuit, control module, etc.) may modify the Grade B fasteners order by substituting Grade A fasteners. In another example, based on the supplier's performance history (e.g., deliveries on average are late by 4 hours) the process progression determination may be modified.

Management data source 24 may provide data including information relating to corporate goals, such as, target yield rates, target scrap rates, target production, target failure rates, target manhours, or target cost of goods. The management data may be utilized to determine process progression and/or modify product production.

Production data source 26 may provide data including information relating to throughput, yield, scrap, machine runtime, machine age, scheduled maintenance, machine repair histories, or production status data. The production data may be utilized to determine process progression and/or modify product production. For example, a machine runtime may be factored into the process progression because the machine has been running for 1,900 hours and requires routine maintenance every 2,000 hours.

Accounting data source 28 may provide data including information relating to maintenance cost, revenue, profits, taxes, energy cost, material cost, labor cost, cost of goods sold, or trend lines for any of these elements. The accounting data may be utilized to determine process progression and/or modify product production. For example, energy cost for packaging unit one is twice as high as for packaging unit two which may indicate that corrective action needs to be taken. In an exemplary embodiment, processing logic 12 may indicate and/or implement this corrective action (e.g., repairs, routing more output to packaging unit two, upgrading packaging unit two, or replacing packaging unit two).

Inventory data source 30 may provide data including information relating to raw material availability, order date, delivery date, raw material shortages, raw material supply, substitute product data, raw material production data, or supplier performance history.

Figure 2:
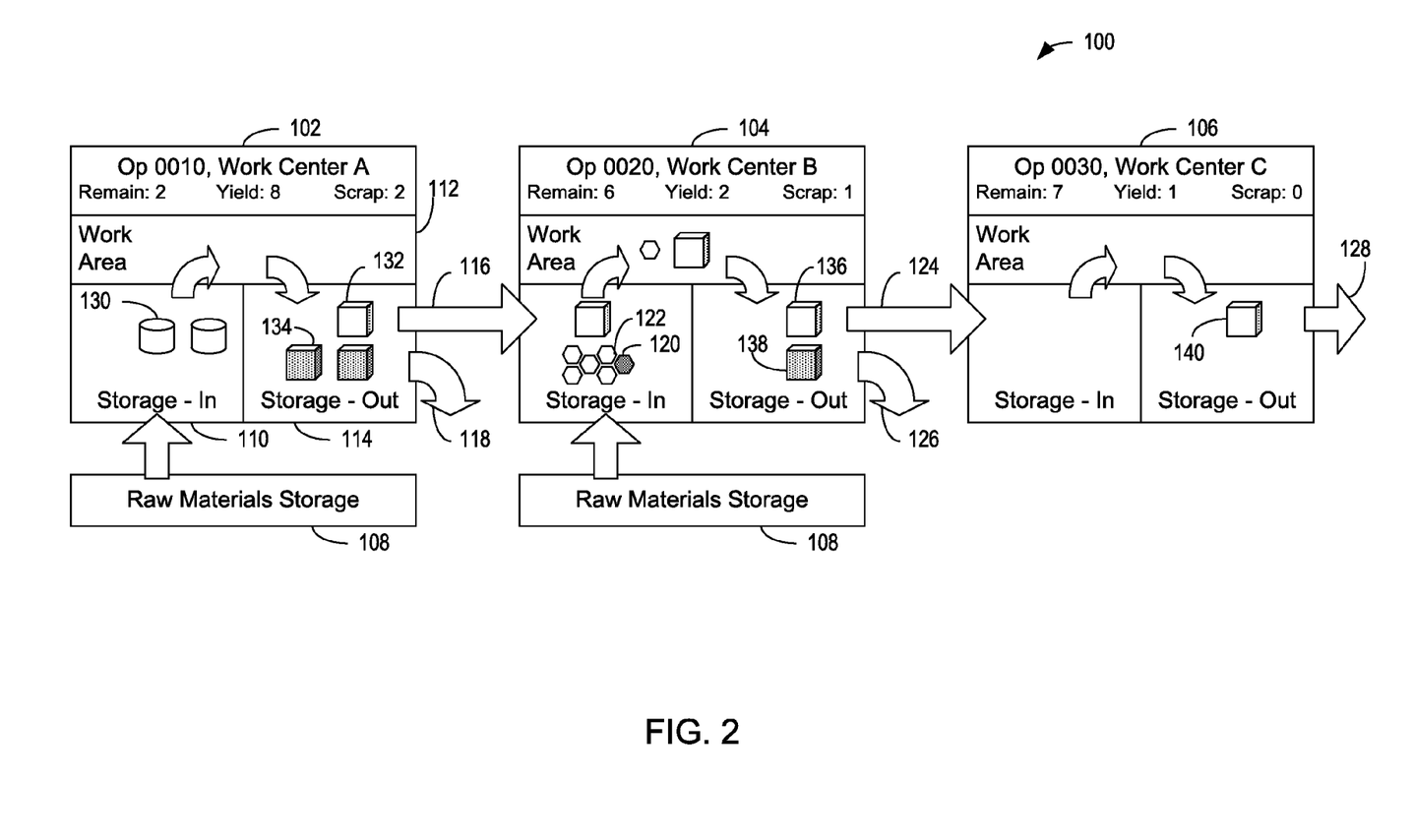
FIG. 2 is an illustration of a production line, according to one exemplary embodiment.

In FIG. 2, an illustration of a production line 100 is shown, according to an exemplary embodiment. Production line 100 may include multiple operations (e.g., 1 to N). In this exemplary embodiment, production line 100 includes a first operation 102, a second operation 104, and a third operation 106. The operations (e.g., 1 to N) may be divided into a storage-in area 110, a work area 112, and a storage-out area 114. First operation 102 may receive raw material 130 from a material storage area 108. Raw material 130 may be processed in work area 112 and delivered to storage-out area 114. A first operation finished product 132 may be delivered to second operation 104 via a first operation to second operation path 116. A first operation product scrap 134 may be removed via first scrap path 118.

Second operation 104 may receive raw material from material storage area 108. Raw material may include normal material 122 and damaged material 120. In an exemplary embodiment, normal material 122 and first operation finished product 132 may be processed in work area 112 of second operation 104. A second operation finished product 136 may be delivered to third operation 106 via a second operation to third operation path 124. A second operation product scrap 138 may be removed via second scrap path 126.

Third operation 106 may receive second operation finished product 136 and process second operation finished product 136 in work area 112 of third operation 106. A third operation finished product 140 may be transferred for shipment or further processing via a third operation path 128.

In an exemplary embodiment, processing logic 12 may confirm that the raw material was damaged or unusable. This confirmation may occur during none of the operations, one operation, multiple operations, or all of the operations.

In an exemplary embodiment, when raw material needs to be scrapped, processing logic 12 may determine whether replacement raw material needs to be ordered. Processing logic 12 may determine the status (e.g., ahead of schedule, behind schedule, on schedule) of the other operations to determine whether to implement a replacement order.

In another exemplary embodiment, when store-in area 110 of any operation is empty, processing logic 12 may determine the cause of this condition by requesting data from the other operations and determine remedial measures.

Figure 3:
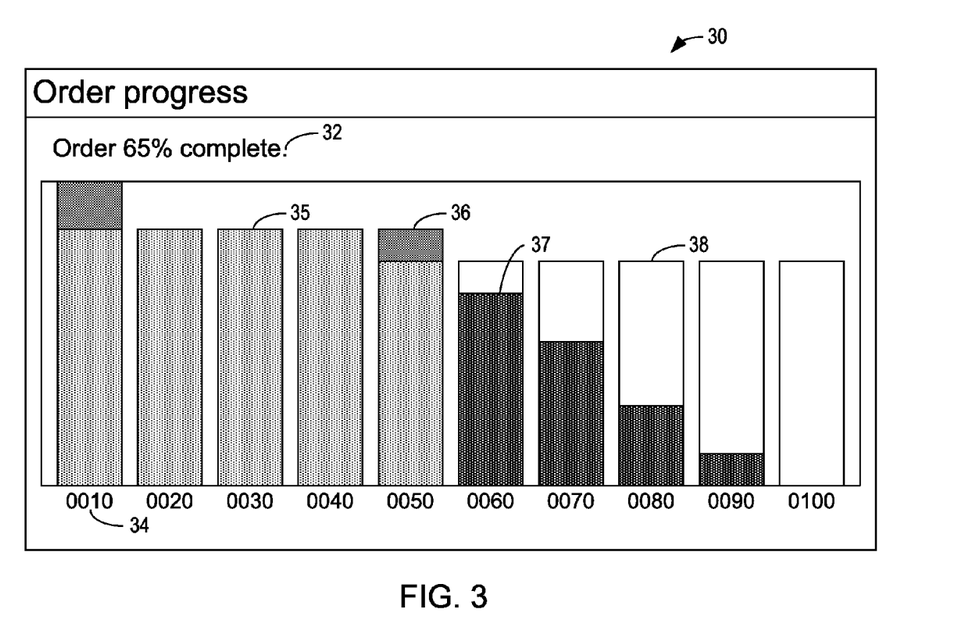
FIG. 3 is an illustration of an order progression screen, according to one exemplary embodiment.

In FIG. 3, an illustration of an order progression screen 30 is shown, according to an exemplary embodiment. Order progression screen 30 may include a status indication field 32 and a plurality of operation fields 34. Operation field 34 may include a scrap field 36, a confirmed yield field 35, an unconfirmed yield field 37, and a remainder field 38. Scrap field 36 may represent the amount of product that is damaged or unusable. Confirmed yield field 35 may represent the amount of product that has had all the necessary process steps completed in an operational area. Unconfirmed yield field 37 may represent the amount of product that has not had all the necessary process steps completed but the product has not been designated as scrap. Remainder field 38 may represent the total amount of potential product that may still be produced which may be based on the total amount of scrap produced to date. In an exemplary embodiment, scrap field 36, confirmed yield field 35, unconfirmed yield field 37, and remainder field 38 may show values which are relative to the planned total operation quantity. In another example, operations can be compared to each other even though the units of each operation may be different (e.g., one operation has a planned quantity of 10 pieces and another operation has a planned quantity of 5,000 meters).

Figure 4:
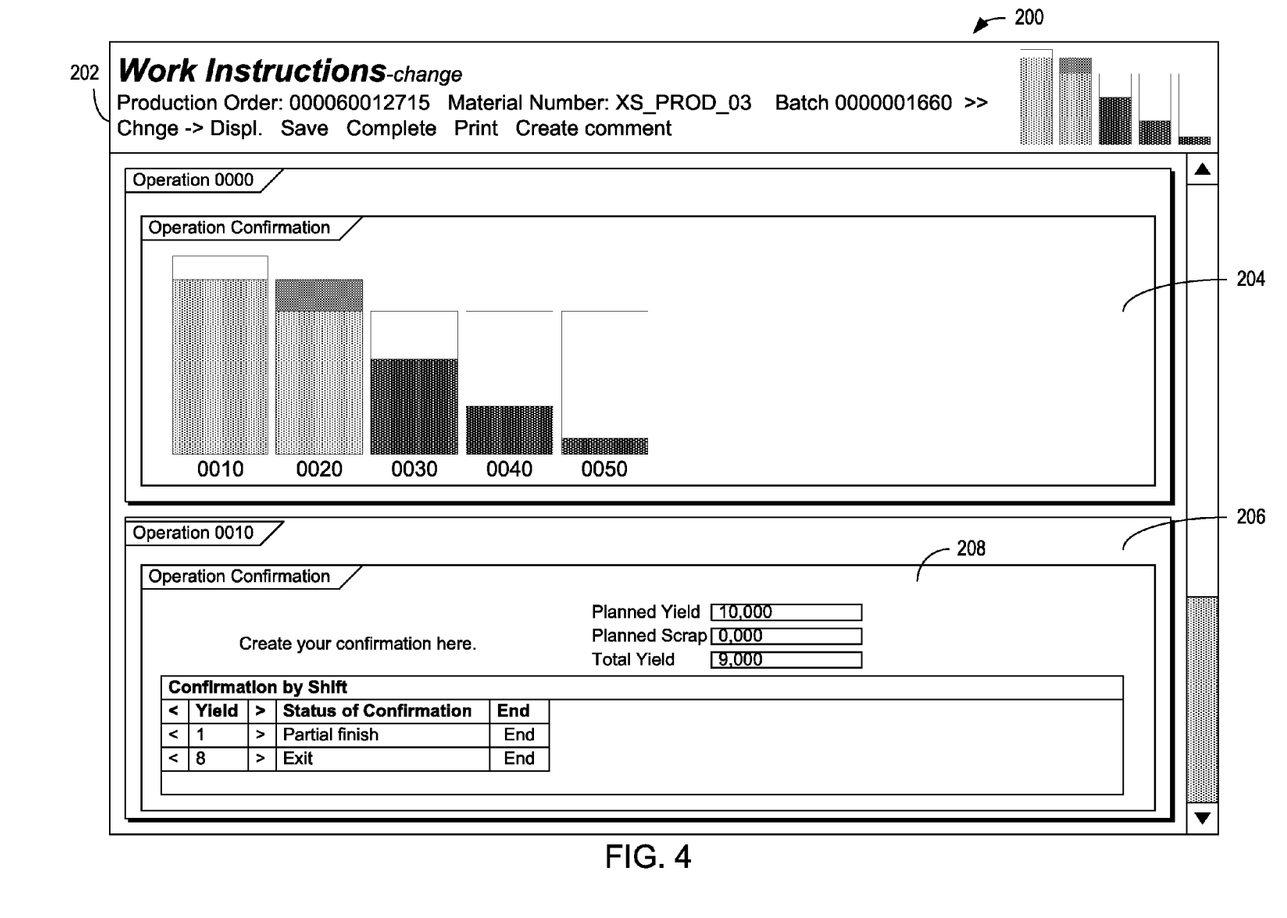
FIG. 4 is an illustration of a combined order progression screen and an operation confirmation screen, according to an exemplary embodiment.

In FIG. 4, an illustration of a combined order progression screen and an operation confirmation screen 200 is shown, according to an exemplary embodiment. Screen 200 may include function fields 202 which may allow the user to change, display, save, complete, print, or create a comment area. Screen 200 may include an order progression area 204 and an operation confirmation area 206. Operation confirmation area 206 may include data relating to the product production process, such as, product status, yield targets, actual yield, scrap targets, actual scrap, quantity of finished products, quantity of raw material, or any other product production data as discussed previously. In an exemplary embodiment, processing logic 12 may confirm that operational instructions have been executed, will be executed, or have been cancelled.

Figure 5A:
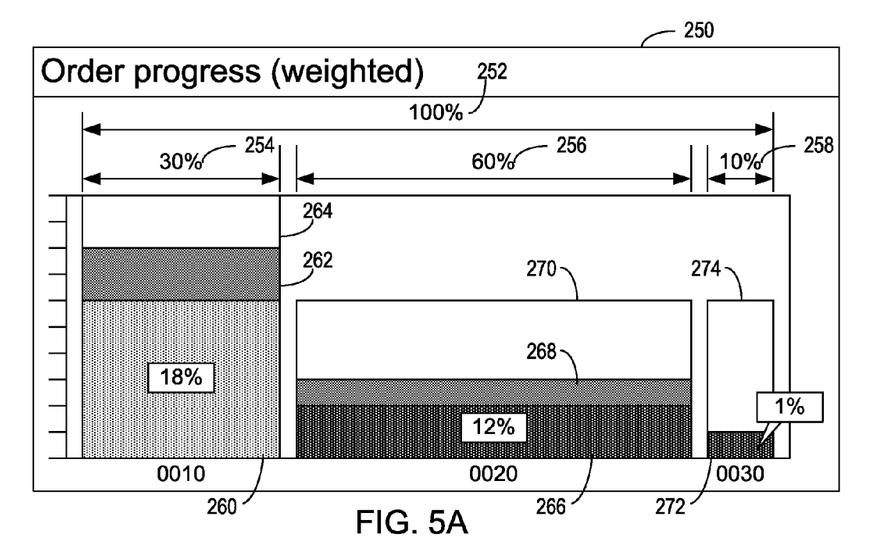
FIG. 5A is an illustration of a weighted order progression screen, according to an exemplary embodiment.

In FIG. 5A, an illustration of a weighted order progression screen 250 is shown, according to an exemplary embodiment. Weighted order progression screen 250 may include an order progression field 252. Order progression field 252 may include multiple operation fields (e.g., 1 to N). Order progression field 252 may include a first operation progression field 254, a second operation progression field 256, and a third operation progression field 258, according to an exemplary embodiment. The operation progression fields may be weighted according to their planned operation duration (e.g., time to complete operation), criticality of operation (e.g., heat treatment precision is required to have an ISO certification), operational cost, manhour cost, material cost, rate of failure, rate of scrap, throughput, yield, or any other operational element discussed in this disclosure.

For example, first operation progression field 254 is weighted at thirty percent (30%), second operation progression field 256 is weighted at sixty percent (60%), and third operation progression field 258 is weighted at ten percent (10%). First operation progression field 254 may include a first operation finished product field 260, a first operation scrap field 262, and a first operation remainder field 264. Second operation progression field 256 may include a second operation finished product field 266, a second operation scrap field 268, and a second operation remainder field 270. Third operation progression field 258 may include a third operation finished product field 272 and a third operation remainder field 274. In an exemplary embodiment which will be further discussed below, first operation contributes eighteen percent (18%), second operation contributes twelve percent (12%), and third operation contributes one percent (1%) to the weighted order progress determination, respectively.

Figure 5B:
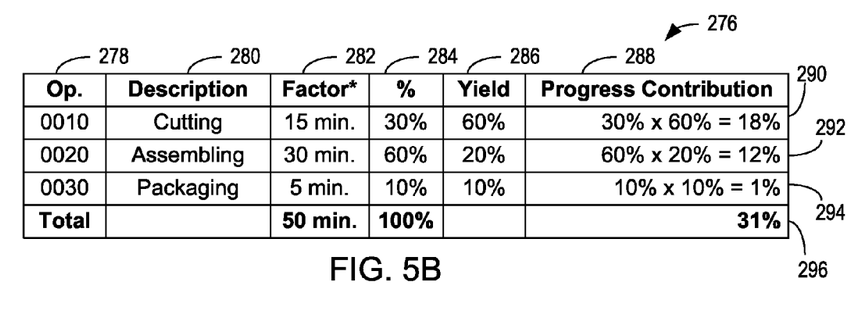
FIG. 5B is an illustration of a table utilized to determine the weighting of the order progression, according to an exemplary embodiment.

In FIG. 5B, an illustration of a table utilized to determine the weighting of the order progression is shown, according to an exemplary embodiment. An order progression determination table 276 may include an operations field 278, a description field 280, a factor field 282, a weighting field 284, a yield field 286, and a progress contribution field 288. Operations field 278 may include multiple operations (e.g., first operation, second operation, third operation, etc.). Description field 280 may include a description of the operation (e.g., cutting, curing, assembling, packaging, etc.). Factor field 282 may include any factor (e.g., planned operation duration (e.g., time to complete operation), criticality of operation (e.g., heat treatment precision is required to have an ISO certification), operational cost, manhour cost, material cost, rate of failure, rate of scrap, throughput, yield, or any other operational element discussed in this disclosure). In this example, time to complete an operation is utilized as the factor. Weighting field 284 may be determined by dividing each value in each factor field 282 by the sum of all values in factor fields 282. For example, fifteen minutes divided by fifty minutes (e.g., the sum of fifteen minutes, thirty minutes and five minutes) equals thirty percent. Yield field 286 may be determined by dividing the value in first operation finished product field 260 by the total value in first operation progression field 254. For example, first operation finished product field 260 has a value of six and the total value in first operation progression field 254 is ten. Therefore, six divided by ten equals sixty percent.

A first operation progress contribution 290 may be determined by multiplying the value in weighting field 284 for first operation by the value in yield field 286 for first operation. For example, thirty percent times sixty percent equals eighteen percent. A second operation progress contribution 292 and a third operation progression contribution 294 may be obtained in a similar manner. A total progress contribution 296 may be calculated by adding all the values in progress contribution field 288. For example, adding eighteen, twelve, and one percent together results in total progress contribution 296 equaling thirty-one percent.

Figure 6A:
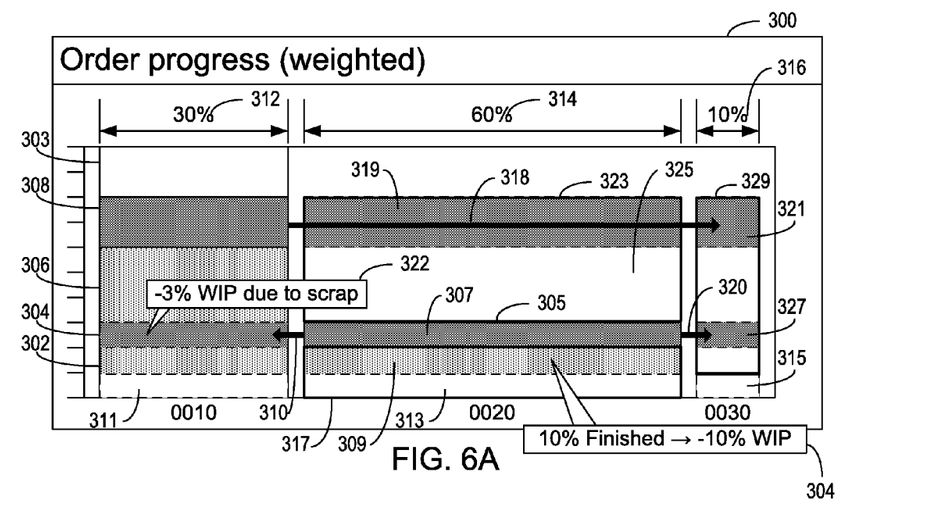
FIG. 6A is another illustration of a weighted order progression screen, according to an exemplary embodiment.

In FIG. 6A, another illustration of a weighted order progression screen 300 is shown, according to an exemplary embodiment. Weighted order progression screen 300 may include a first operation field 312, a second operation field 314, and a third operation field 316. First operation field 312 may include a first operation finished product area 306, a first operation scrap area 308, and a first operation remainder area 303. First operation finished product area 306 may include a finished product area 311 for first operation, a second operation completed product area 302 for first operation, and a finished product scrap area 304. Finished product area 311 represents products that have successfully (e.g., no scrap) completed all of the operational steps (e.g., first operation, second operation, third operation, etc.). Second operation completed product area 302 represents products that have successfully completed both first operation and second operation. Finished product scrap area 304 represents products that have successfully completed first operation but have not successfully (e.g., scraped) completed second operation. In an exemplary embodiment, the value in a second operation scrap field 305 equals the value in finished product scrap area 304.

In an exemplary embodiment, second operation field 314 may include a second operation finished product area 317, second operation scrap field 305, and a second product remainder area 323. Second operation finished product area 317 may include a finished product area 313 for second operation, a second operation completed product area 309 for second operation, and a finished product scrap area (not shown) for clarity. Finished product area 313 represents products that have successfully completed all of the operational steps. Second operation completed product area 309 represents products that have successfully completed both first operation and second operation. Finished product scrap area represents products that have successfully completed first operation and second operation but have not successfully (e.g., scrapped) completed third operation. Second product remainder area 323 may include a first remainder area 325 and a second remainder area 319. First remainder area 325 may represent the number of products that may still be able to be completed. Second remainder area 319 may represent the number of products that can no longer be produced in second operation because of scrap generated in first operation. A first scrap line 318 may indicate that the units lost (e.g., scrapped) in first operation may no longer be utilized in second operation, third operation, or any other operation which follows first operation. Second scrap lines 310, 320 may indicate that the units lost in the second operation may no longer be utilized in third operation (or any operation which follows second operation) and may represent a lost in work-in-process for the first operation.

In an exemplary embodiment, third operation field 316 may include a third operation finished product area 315 and a third operation remainder area 329. Third operation finished product area 315 may represent products that have successfully completed all of the operational steps. Third operation remainder area 329 may include a third remainder area 327 and a fourth remainder area 321. Third remainder area 327 may represent the number of products that may no longer be produced in third operation because of scrap generated in second operation. Fourth remainder area 321 may represent the number of products that may no longer be produced in third operation because of scrap generated in first operation.

Figure 6B:
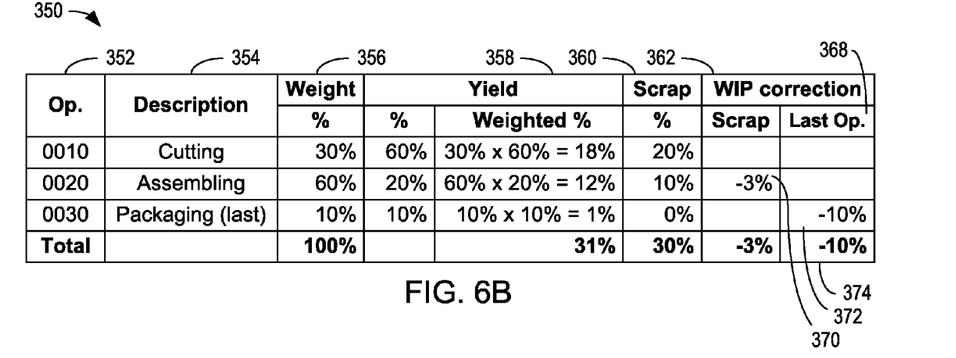
FIG. 6B is another illustration of a table utilized to determine the weighting of the order progression, according to an exemplary embodiment.

In FIG. 6B, another illustration of a table utilized to determine the weighting of the order progression is shown, according to an exemplary embodiment. An order progression determination table 350 may include an operations field 352, a description field 354, a weighting field 356, a yield field 358, a scrap field 360, and a work-in-process correction field 362. Operations field 352 may include multiple operations (e.g., first operation, second operation, third operation, etc.). Description field 354 may include a description of the operation (e.g., cutting, curing, assembling, packaging, etc.). Weighting field 356 may include any factor ((e.g., planned operation duration (e.g., time to complete operation), criticality of operation (e.g., heat treatment precision is required to have an ISO certification), operational cost, manhour cost, material cost, rate of failure, rate of scrap, throughput, yield, or any other operational element discussed in this disclosure)) to determine weighting. In this example, time to complete an operation is utilized as the weighting factor. For example, the weighting value for first operation may be determined by taking fifteen minutes divided by fifty minutes (e.g., the sum of fifteen minutes, thirty minutes and five minutes) equals thirty percent. The determinations of values for yield field 358 and scrap field 360 were previously discussed in relation to FIG. 5B. In an exemplary embodiment, a second operation work-in-process correction value 370 may be calculated. In an exemplary embodiment, a third operation work-in-process correction value 372 may be determined by calculating the portion of the total order which has been successfully completed by all of the operations (e.g., operation one, operation two, operation three, etc.).

Figure 6C:
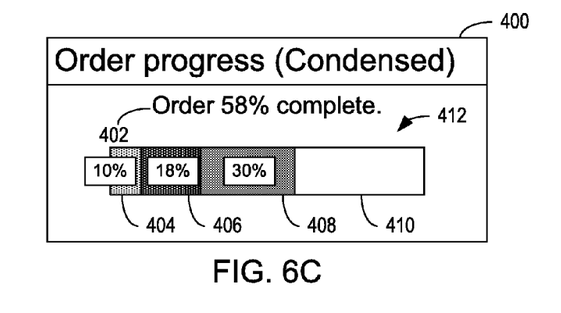
FIG. 6C is an aggregated order progression screen, according to an exemplary embodiment.

In FIG. 6C, an aggregated order progression screen 400 is shown, according to an exemplary embodiment. Aggregated order progression screen 400 may be a full screen, half a screen, a third of a screen, a thumbnail, or any other sizes. Aggregated order progression screen 400 may include a status field 402 and a status bar 412. Status bar 412 may include a finished status area 404, a work-in-process area 406, a scrap area 408, and a non-complete area 410. The value for finished status area 404 may be the number of units that have successfully completed all of the operational steps (e.g., first operation, second operation, third operation, etc.). The value for work-in-process area 406 may be calculated by taking the yield value (e.g., weighted or unweighted) and subtracting any work-in-process correction factor and the value from finished status area 404. The value for scrap area 408 may be obtained by summing all of the scrap values for each operation. Non-complete area 410 may be calculated by taking the value of one-hundred percent and subtracting the values for finished status area 404, work-in-process area 406, and scrap area 408.

Figure 10:
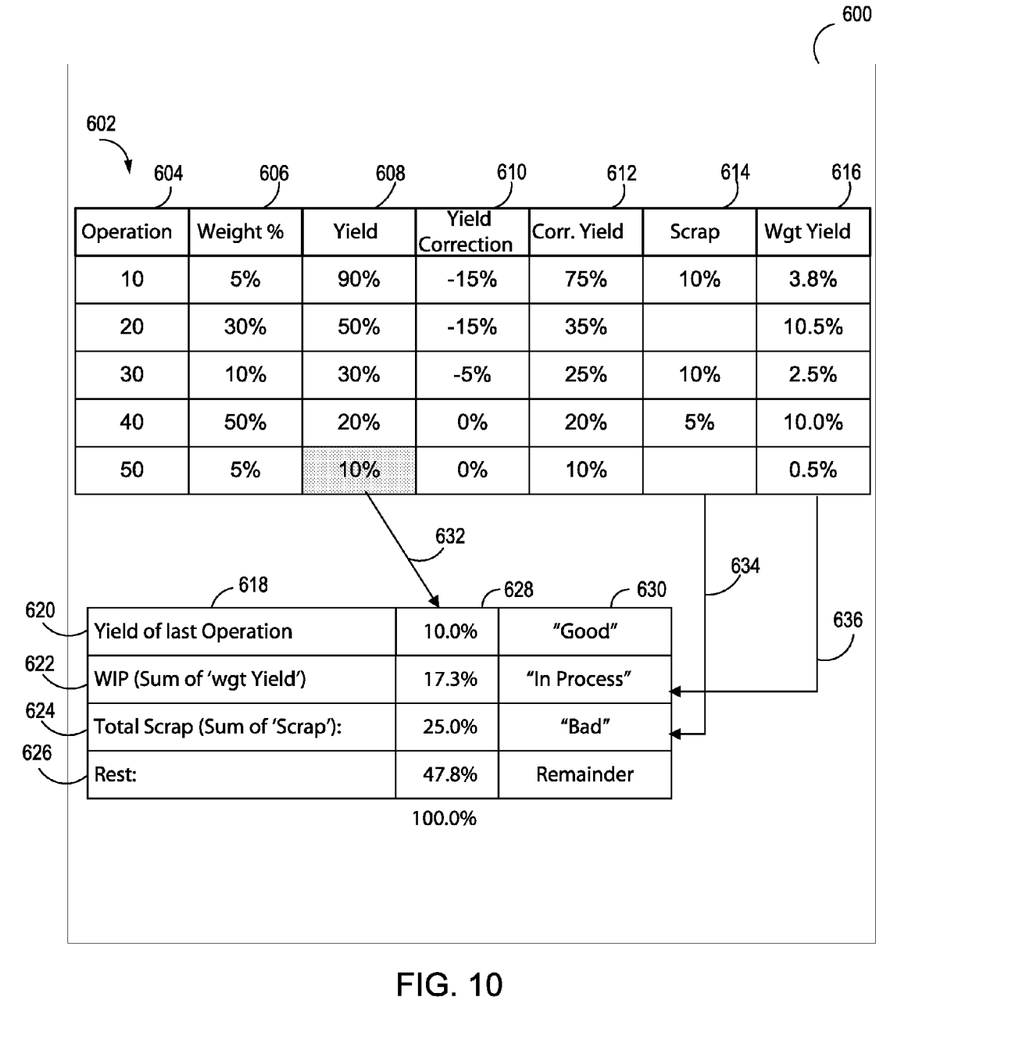
FIG. 10 is another illustration of tables which may be utilized to determine the order progression, according to an exemplary embodiment.

In FIG. 10, an illustration of a first table 602 and a second table 618 which may be utilized to determine the order progression are shown, according to an exemplary embodiment. First table 602 may include an operational field 604, a weighting field 606, a yield field 608, a yield correction field 610, a correction yield field 612, a scrap field 614, and a weighted yield field 616. Operational field 604 may include multiple operations (e.g., first operation, second operation, third operation, etc.). Weighting field 606 may include any factor ((e.g., planned operation duration (e.g., time to complete operation), criticality of operation (e.g., heat treatment precision is required to have an ISO certification), operational cost, manhour cost, material cost, rate of failure, rate of scrap, throughput, yield, or any other operational element discussed in this disclosure)) to determine weighting. The determinations of values for yield field 608 and scrap field 614 were previously discussed in relation to FIG. 5B. In an exemplary embodiment, a value for yield correction field 610 for an operation may be calculated by summing up all the scrap values (in %) from the next operation until the last operation and negating this value. For example, the value for yield correction field 610 for operation ten may be determined by taking the negative of the sum of scrap values for operations 20 through 50. In this example, operation 50 has a scrap value of zero, operation 40 has a scrap value of five percent, operation 30 has a scrap value of ten percent, and operation 20 has a scrap value of zero. Therefore, the sum of these scrap values is fifteen percent and negating this number equals negative fifteen percent. In another example, the value (e.g., negative five percent) for yield correction field 610 for operation 30 may be calculated by taking the negative of the sum of zero (e.g., scrap value for operation 50) and five percent (e.g., scrap value for operation 40).

In an exemplary embodiment, a value for correction yield field 612 may be calculated by summing the value in yield field 608 and the value in yield correction field 610. For example, the value for correction yield field 612 for operation 10 would be the sum of ninety percent and negative fifteen percent, which equals seventy-five percent. In an exemplary embodiment, a value for weighted yield field 616 may be calculated by multiplying the value in correction yield field 612 by the value in weighted field 606. For example, the value for weighted yield field 616 for operation 10 would be determined by multiplying seventy-five percent by five percent, which equals three point eight percent.

Second table 618 may include a yield of last operation field 620, a work-in-process field 622, a total scrap field 624, a rest field 626, a values field 628, and a comment field 630. The value for yield of last operation field 620 may be determined from last operation yield which may be shown by a first link 632. The value for work-in-process field 622 may be determined by summing all the values in weighted yield field 616 and subtracting the yield of the last operation (yield of last operation field 620), which may be shown by a second link 634. The value for total scrap field 624 may be determined by summing all the values in scrap field 614 which may be shown by a third link 636. The value for rest field 626 may be determined by subtracting the sum of the values in yield of last operation field 620, work-in-process field 622, and total scrap field 624 from one hundred percent.

Figure 7:
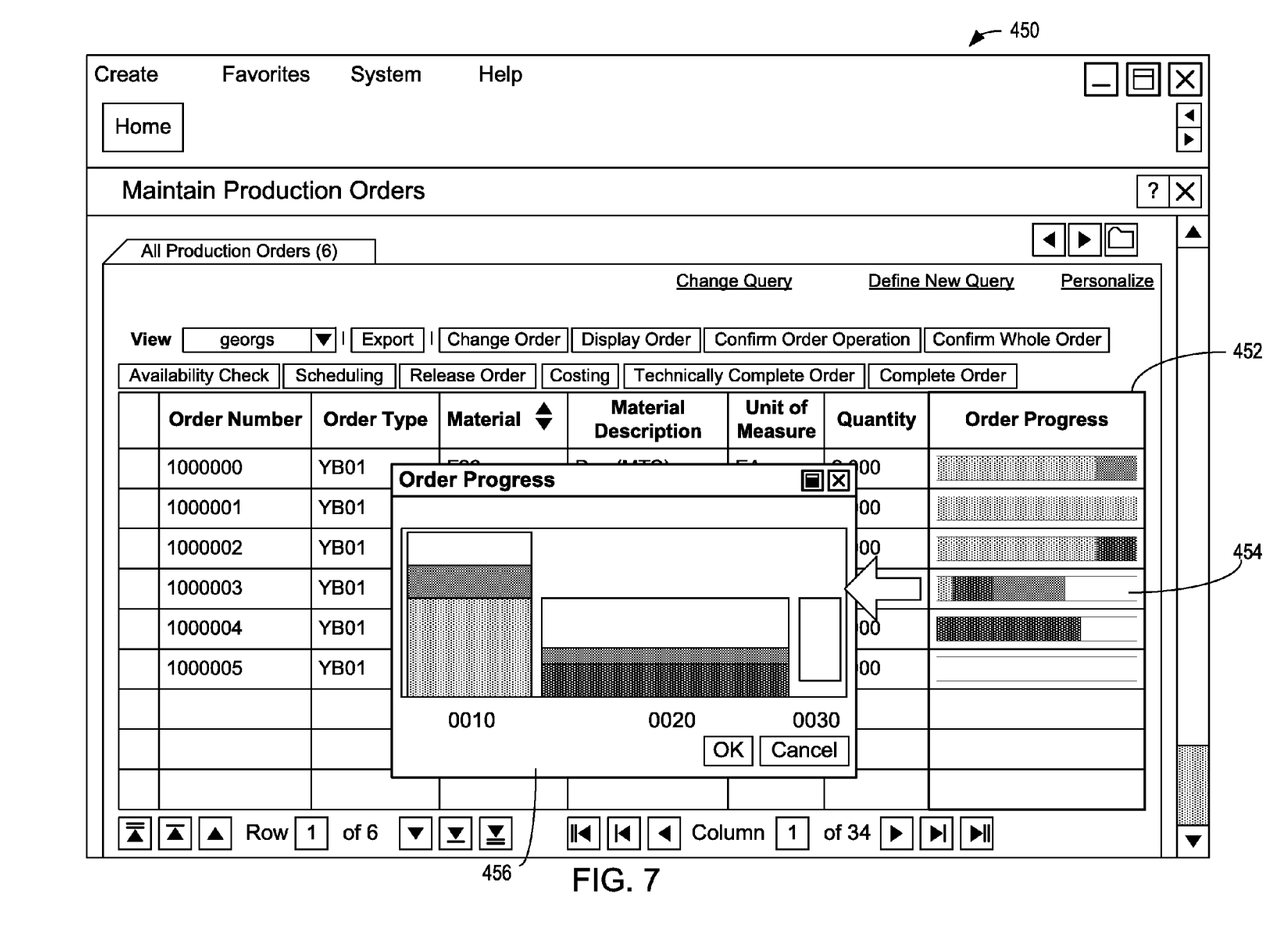
FIG. 7 is an illustration of order progressions for multiple products, according to an exemplary embodiment.

In FIG. 7, an illustration of order progressions for multiple products is shown, according to an exemplary embodiment. A production screen 450 may include an order progress area 452 for multiple products. A product bar 454 may display the production progress for a first product. Product bar 454 may be highlighted to display a first product order progress screen 456.

Figure 8:
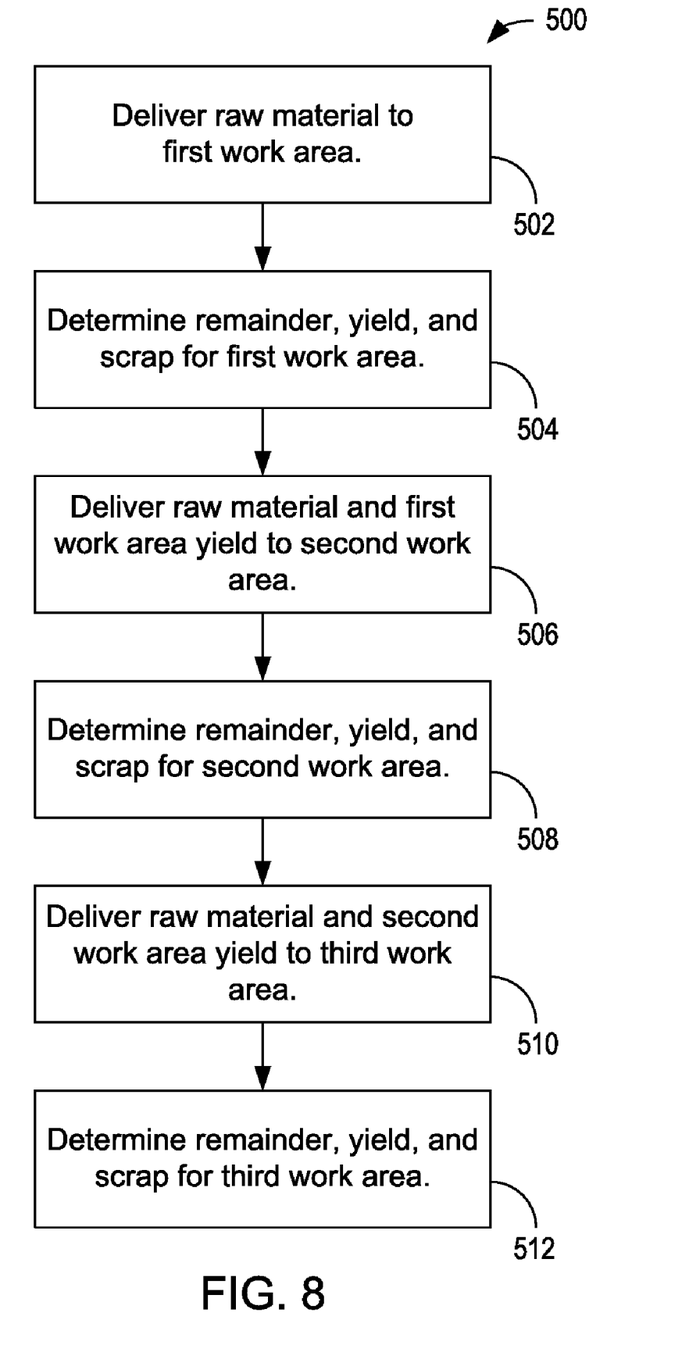
FIG. 8 is a flowchart for monitoring the order production progress, according to an exemplary embodiment.

In FIG. 8, a flowchart 500 for monitoring the order production progress is shown, according to an exemplary embodiment. Raw material may be delivered to first work area (step 502). Processing logic 12 may determine remainder, yield, scrap, or any other value for first work area (step 504). Raw material and first work area yield (e.g., products) may be delivered to second work area (step 506). Processing logic 12 may determine remainder, yield, scrap, or any other value for second work area (step 508). Raw material and second work area yield (e.g., products) may be delivered to third work area (step 510). Processing logic 12 may determine remainder, yield, scrap, or any other value for third work area (step 512).

Figure 9:
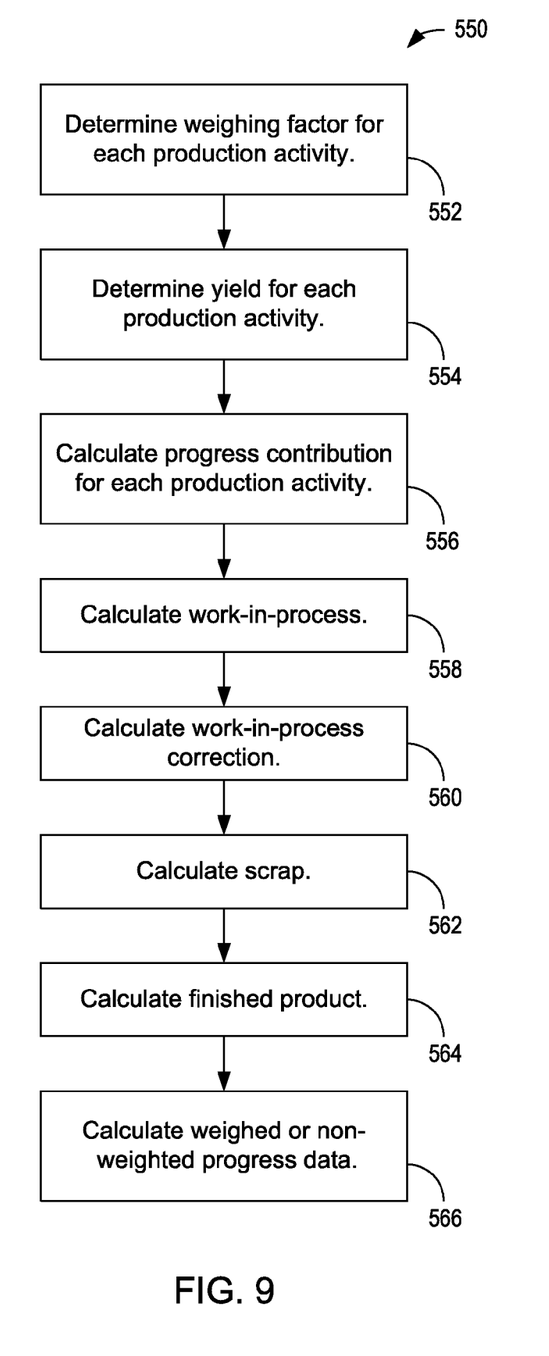
FIG. 9 is another flowchart for monitoring the order production progress, according to an exemplary embodiment.

In FIG. 9, another flowchart 550 for monitoring the order production progress is shown, according to an exemplary embodiment. Processing logic 12 may determine weighting factor for each production activity (step 552). Processing logic 12 may determine yield for each production activity (step 554). Processing logic 12 may calculate progress contribution for each production activity (step 556). Processing logic 12 may calculate work-in-process (step 558). Processing logic 12 may calculate work-in-process correction factor (step 560). Processing logic 12 may calculate scrap values (step 562). Processing logic 12 may calculate finished product values (step 564). Processing logic 12 may calculate weighted or non-weighted progress data (step 566). Processing logic 12 may transmit signals to a display circuit (not shown) to allow for the display of data related to these calculations. Processing logic 12 may prioritize any of the following: the production schedule; the weighting factors; raw material deliveries to operational units; raw material deliveries from supplier; labor force allocations and placements; product rework; line speed; product throughput; machine throughput; maintenance; machine replacement/repair; any element related to product production; or any combination thereof.

In an exemplary embodiment, a monitoring system may include a control circuit which determines scrap values, yield values, and remainder values for multiple operations (e.g., first operation, second operation, third operation, etc.). Control circuit may transmit a display signal. Display signal may include instructions to display a first operation status bar and a second operation status bar. The first operation status bar may include a first operation yield value, a first operation scrap value, and a first operation remainder value. The second operation status bar may include a second operation yield value, a second operation scrap value, and a second operation remainder value. In another exemplary embodiment, control circuit may monitor a status of one operation relative to another (e.g., the first operation in relation to the second operation, the second operation in relation to the first operation, the first operation in relation to the third operation, the second operation in relation to the third operation, the third operation in relation to the second operation, etc.). In another exemplary embodiment, control circuit may determine remedial steps (e.g., order raw material, have items picked up, speed up production, slow down production, modify production, implement maintenance, postpone maintenance, etc.) related to one operation based on the status of another operation. In another exemplary embodiment, the control circuit may transmit instructions for a remedial step implementation.

In another exemplary embodiment, control circuit may determine that no remedial steps are required related to one operation based on the status of the other operation. In another exemplary embodiment, the control circuit may modify one operation based on the status of more than one operation. In an exemplary embodiment, the operation value units (e.g., units, pieces, meters) may be different for each operation.

In an exemplary embodiment, a production line monitoring method may include determining a first operation scrap value, a first operation yield value, and a first operation remainder value. The method may further include determining scrap values, yield values, and remainder values for additional operating steps (e.g., second operation, third operation, etc.). The method may further include transmitting a display signal. The method may also include displaying a first operation status bar comprising a first operation yield value, a first operation scrap value, and a first operation remainder value. In addition, the method may include displaying operation status bars for multiple operations.

In an exemplary embodiment, the method may include monitoring a status of one operation in relation to another operation as discussed previously. The method may further include determining remedial steps related to one operation based on the status of another operation (or the status of multiple operations). The method may include transmitting instructions for a remedial step implementation based on the status information. The method may include modifying one operation based on the status of one or more operations.

In an exemplary embodiment, monitoring system may include a control circuit which may determine scrap values, yield values, and remainder values for multiple operations. The control circuit may determine weighting factors for multiple operations. Control circuit may determine operation progress contribution based on an operation's yield data and the operation's weighting factor. Control circuit may determine a total progression based on the sum of the operation progression contributions or any subset therein. Control circuit may transmit a display signal. The display signal may include instructions to display a first operation status bar. The first operation status bar may include a first operation status bar area. The first operation status bar area may include dimensions based on the first operation weighting factor. For example, when the first operation weighting factor is thirty percent and the second operation weighting factor is seventy percent, the first operation status bar area may represent thirty percent of the total progress bar and second operation status bar area may represent seventy percent of the total progress bar. In an exemplary embodiment, control circuit may determine a work-in-process correction factor. The display signal may include instructions to display data relating to the work-in-process correction factor. The display signal may further include instructions for displaying a condensed order progress status bar. Control circuit may monitor a status of one operation in relation to another operation (or multiple operations). Control circuit may determine remedial steps related to one operation based on the status of another operation (or multiple operations). Control circuit may transmit instructions for a remedial step implementation. Control circuit may modify one operation based on the status of another operation (or multiple operations).

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. §112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable media for carrying or having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such a connection is properly termed a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A monitoring system comprising:
   a control circuit configured to determine scrap values, yield values, and remainder values for at least a first operation and a second operation, the control circuit being configured to: transmit one or more display signals, monitor a status of the first operation in relation to the second operation, determine remedial steps related to the second operation based on the status of the first operation, and transmit instructions for a remedial step implementation;
   wherein the one or more display signals comprise instructions to display a first operation status bar and a second operation status bar;

wherein the first operation status bar comprises a first operation yield value, a first operation scrap value, and a first operation remainder value;

wherein the second operation status bar comprises a second operation yield value, a second operation scrap value, and a second operation remainder value.

2. The monitoring system of claim 1, wherein the control circuit is further configured to determine that no remedial steps are required related to the second operation based on the status of the first operation.

3. The monitoring system of claim 1, wherein the control circuit is further configured to modify the first operation based on the status of the first operation.

4. The monitoring system of claim 1, wherein a first operation value units and a second operation value units are different units.

5. A method for monitoring a system, comprising:
determining a first operation scrap value;
determining a first operation yield value;
determining a first operation remainder value;
determining a second operation scrap value;
determining a second operation yield value;
determining a second operation remainder value;
transmitting one or more display signals;
displaying a first operation status bar comprising a first operation yield value, a first operation scrap value, and a first operation remainder value, the first operation status bar representing product production for a first operation;
displaying a second operation status bar comprising a second operation yield value, a second operation scrap value, and a second operation remainder value, the second operation status bar representing product production for a second operation;
monitoring a status of the first operation in relation to the second operation;
determining remedial steps related to the second operation based on the status of the first operation; and
determining remedial steps related to the second operation based on the status of the first operation.

6. The method of claim 5, further comprising modifying the first operation based on the status of the first operation.

7. A monitoring system comprising:
a control circuit configured to determine scrap values, yield values, and remainder values for at least a first operation and a second operation;
the control circuit being configured to determine at least a first operation weighting factor and a second operation weighting factor, the control circuit being further configured to determine a first operation progress contribution based on a first operation yield value and the first operation weighting factor, the control circuit being configured to determine a second operation progress contribution based on a second operation yield value and the second operation weighting factor, the control circuit being further configured to determine a total progress based on the first operation progress contribution and the second progress contribution, the control circuit being further configured to determine a work-in-process correction factor, the control circuit being further configured to determine remedial steps related to the second operation based on the status of the first operation, the control circuit being further configured to transmit instructions for a remedial step implementation; and
the control circuit being configured to transmit one or more display signals;

wherein the one or more display signals comprise instructions to display a first operation status bar, the first operation status bar comprising a first operation status bar area, the first operation status bar area including dimensions based on the first operation weighting factor, the first operation status bar comprises a first operation yield value, a first operation scrap value, and a first operation remainder value;

wherein the one or more display signals further comprise instructions to display a second operation status bar, the second operation status bar comprising a second operation status bar area, the second operation status bar area including dimensions based on the second operation weighting factor, the second operation status bar comprises a second operation yield value, a second operation scrap value, and a second operation remainder value.

8. The monitoring system of claim 7, wherein the control circuit is further configured to determine a work-in-process correction factor.

9. The monitoring system of claim 8, wherein the one or more display signals may further comprise instructions to display data relating to the work-in-process correction factor.

10. The monitoring system of claim 7, wherein the one or more display signals may further comprise instructions for displaying a condensed order progress status bar.

11. The monitoring system of claim 7, the control circuit being further configured to modify the first operation based on the status of the first operation.

* * * * *